UNITED STATES PATENT OFFICE.

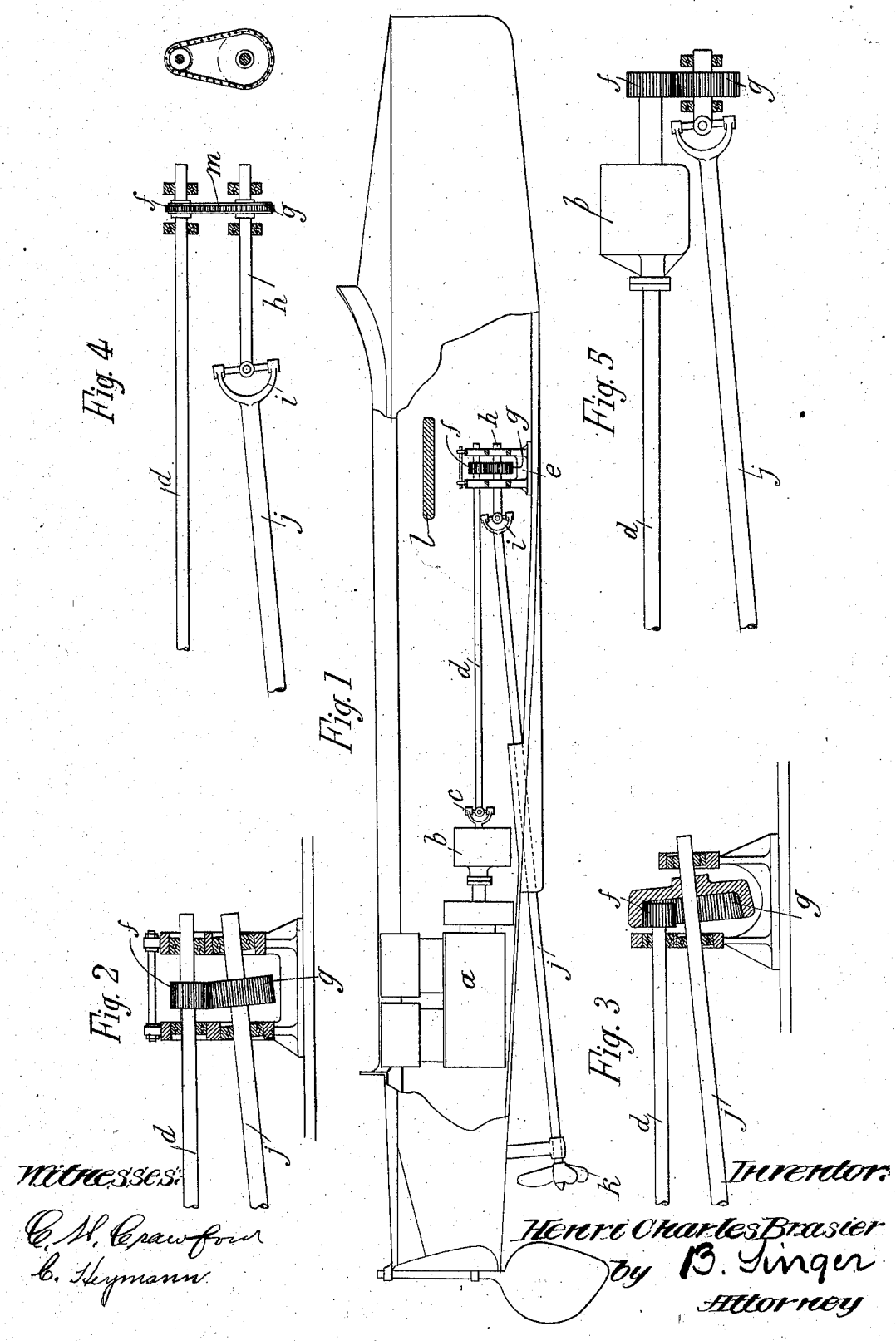

HENRI CHARLES BRASIER, OF IVRY-PORT, FRANCE.

DRIVING-GEAR OF MOTOR-BOATS.

No. 833,769.    Specification of Letters Patent.    Patented Oct. 23, 1906.

Application filed March 15, 1906. Serial No. 306,230.

*To all whom it may concern:*

Be it known that I, HENRI CHARLES BRASIER, a citizen of the Republic of France, residing at Ivry-Port, France, have invented new and useful Improvements in Driving-Gear of Motor-Boats, of which the following is a specification.

This invention relates to driving-gear for motor-boats, and is designed to provide an arrangement which shall permit of obtaining the maximum amount of unoccupied space in the bow of the boat and of carrying back the weight of the motor to the stern, and it permits also of driving at a convenient speed a screw of a diameter appropriate to a hull determined by a motor of any speed whatever.

The invention will be fully described with reference to the accompanying drawings, in which one form of the invention is shown diagrammatically.

Figure 1 is a diagrammatic longitudinal section of a boat provided with the driving-gear; Figs. 2, 3, 4, and 5 modified forms of driving-gear.

As shown in Fig. 1, the motor $a$ is placed in the stern of the boat, and in front of it is provided a change-speed-gear device $b$, attached, by means of a universal joint $c$, to a longitudinal shaft $d$. This shaft rests in antifriction or ball bearings in a support or bracket $e$ and carries near its end a toothed wheel $f$. This wheel $f$ gears with another toothed wheel $g$, preferably of greater diameter, mounted on a shaft $h$, parallel to the shaft $d$ and supported in a similar manner in a support or bracket $e$. This shaft $h$ is connected by a universal joint $i$ with the shaft $j$ of the screw $k$. It will be readily seen that by this arrangement any desired proportion can be given to the diameters of the gear-wheels $f$ and $g$, so as to rotate the screw $k$ at the speed desired according to its diameter, which depends on the dimensions of the boat and on the speed of the motor $a$, also that this arrangement permits of placing the weight of the motor in the stern and of constructing its fly-wheel of a suitable diameter without giving an excessive inclination to the shaft $j$ and leaving all the space in the bow of the boat free and unoccupied. In addition, the motor being close to the rudder, the maneuvering of the boat is much simplified. One can further arrange above the support or bracket $e$ a seat $l$, which conceals a part of the mechanism.

In the mechanism partially shown in Fig. 2 the arrangements of a universal joint between the shafts $d$ and $j$ are avoided, and the shaft $d$ transmits the power by means of a pinion $f$, slightly conical, to another pinion $g$, also slightly conical, mounted direct on the shaft $j$.

In the form shown in Fig. 3 the shaft $d$ also carries a conical pinion $f$; but it gears with an annular wheel $g$, mounted on the shaft $j$.

In Fig. 4 the shaft $d$ carries a pinion $f$, which transmits the movement by a joint $m$ to a toothed wheel $g$, mounted on the shaft $h$, which is connected to the shaft $j$ of the screw by a universal joint $i$, as in the form shown in Fig. 1. An arrangement similar to this would be specially suitable for a twin-screw boat in the case of a shallow draft of water. In this case it would only be necessary to mount, one near the other, on the extremity of the shaft $d$ two pinions, such as $f$, which by two separate chains or by direct gearing would transmit the movement to two wheels, such as $g$, mounted on the two shafts of the screws.

In Fig. 5 the change-speed mechanism $b$ is arranged toward the front of the shaft $d$ and acts directly on a pinion $f$, gearing with the wheel $g$, the shaft of which is connected by a universal joint with the shaft $j$ of the screw.

Having now particularly described and ascertained the nature of my said invention and in what manner the same is to be performed, I declare that what I claim is—

1. A driving-gear for boats comprising a motor located at the stern, a driving-shaft extending forwardly from said motor in a horizontal plane, a propeller located forwardly of the stern and below the keel of the boat, a propeller-shaft inclined with respect to the motor-shaft and extending from the propeller through the bottom of the hull and forwardly therein to a point adjacent the front end of said motor-shaft, conical pinions for said motor and propeller-shafts, and bearings for said shafts spaced apart from said pinions to permit the employment of pinions of different size to vary the speed of said propeller.

2. A driving-gear for boats, comprising in combination a motor located adjacent the stern of the boat, a driving-shaft extending forwardly from said motor, a propeller, a propeller-shaft inclined with respect to the motor-shaft and extending forwardly to a point adjacent the end of the motor-shaft, means operatively connecting said shafts, and bearings for said shafts located on opposite sides of said means and spaced apart therefrom to permit adjustment of said means to vary the speed of said propeller.

3. A driving-gear for boats, comprising in combination a motor located adjacent the stern of the boat, a driving-shaft extending forwardly from said motor, a propeller, a propeller-shaft inclined with respect to the motor-shaft and extending forwardly to a point adjacent the end of the motor-shaft, means operatively connecting said shafts, a bearing-standard provided with uprights located on opposite sides of said means and spaced apart therefrom, and independent bearings for said uprights receiving said motor and propeller-shafts on opposite sides of said means.

4. A driving-gear for boats, comprising in combination a motor located adjacent the stern of the boat, a driving-shaft extending forwardly from said motor, a propeller, a propeller-shaft inclined with respect to the motor-shaft and extending forwardly to a point adjacent the end of the motor-shaft, means operatively connecting said shafts, a bearing-standard provided with uprights located on opposite sides of said means and spaced apart therefrom, and independent bearings for said uprights receiving said motor and propeller-shafts on opposite sides of said means, said uprights being provided with inclined ways for the bearings of said propeller-shaft.

In testimony whereof I have affixed my signature in presence of two subscribing witnesses.

HENRI CHARLES BRASIER.

Witnesses:
 HENRI VIGNAUD,
 JULIUS CASENOVA.